United States Patent [19]

Boudreaux et al.

[11] Patent Number: 5,173,319
[45] Date of Patent: Dec. 22, 1992

[54] METHOD AND COMPOSITION FOR EXTENDING THE SHELF LIFE OF PROCESSED MEATS

[75] Inventors: Donald P. Boudreaux, Sarasota, Fla.; Mark A. Matrozza, North Versailles, Pa.

[73] Assignee: Microlife Technics, Inc., Sarasota, Fla.

[21] Appl. No.: 705,764

[22] Filed: May 28, 1991

Related U.S. Application Data

[63] Continuation of Ser. No. 514,681, Apr. 24, 1990, abandoned.

[51] Int. Cl.$^5$ .............................. A23B 4/02; A23B 4/22
[52] U.S. Cl. ..................................... 426/326; 426/332; 426/335; 426/641; 426/643; 426/656
[58] Field of Search .................. 426/9, 43, 332, 335, 426/326, 524, 56, 641, 643, 656

[56] References Cited

U.S. PATENT DOCUMENTS

| | | | |
|---|---|---|---|
| 3,899,594 | 2/1978 | Nickerson et al. | 426/9 |
| 4,497,833 | 2/1985 | Anderson | 426/41 |
| 4,676,987 | 6/1987 | Ahern et al. | 426/41 |
| 4,743,453 | 5/1988 | Ahern et al. | 426/41 |
| 4,798,729 | 1/1989 | Anders et al. | 426/326 |
| 4,883,673 | 11/1989 | Gonzalez | 426/61 |

FOREIGN PATENT DOCUMENTS 1218894 3/1987 Canada.
1275480 5/1972 United Kingdom.
1562568 3/1980 United Kingdom.

OTHER PUBLICATIONS

Woolford and Anderson, Food Industries 17:622 (1945).
Gilliland et al., American Public Health Assoc. Marvin L. Speck, ed. 173-178 (1976).

Primary Examiner—Jeanette Hunter
Assistant Examiner—Helen Pratt
Attorney, Agent, or Firm—Ian C. McLeod

[57] ABSTRACT

A method for inhibiting the growth of bacteria in raw or processed meat products having a pH between about 6.0 and 6.5 stored at above freezing temperatures using an inorganic propionate salt which extends the shelf life of the meat is described. The salt is preferably sodium propionate or calcium propionate and is used in an amount less than about 1% by weight and preferably between about 0.05 and 0.5 percent by weight of the meat such that no flavor is imparted to the meat. Preferred dried compositions containing a bacteriocin from *Pediococcus acidilactici* and a propionate salt are also described.

12 Claims, No Drawings

METHOD AND COMPOSITION FOR EXTENDING THE SHELF LIFE OF PROCESSED MEATS

CROSS-REFERENCE TO RELATED APPLICATION

This application is a continuation of application Ser. No. 07/514,681, filed Apr. 24, 1990 abandoned Jun. 25, 1991.

BACKGROUND OF THE INVENTION

(1) Field of the Invention

The present invention relates to a method for inhibiting the growth of bacteria in a raw or cooked processed meat at temperatures above freezing and at near neutral pH's with an inorganic propionate salt thereby extending the shelf life of the meat. The present invention relates to preferred compositions including a bacteriocin which are useful in the method. In particular the present invention relates to the use of low levels of a sodium propionate or calcium propionate salt, and preferably the bacteriocin, in the processed meat, such as beef, poultry or fish and mixtures thereof, for this purpose.

(2) Prior Art

The prior art has used propionate salts in various processed foods. Examples are U.S. Pat. No. 3,899,594 to Nickerson et al and British Patent application No. 1,562,568, filed Mar. 12, 1980, and British Patent Application No. 1,275,480. The propionates are used in low pH foods, less than pH 6.0. British Patent No. 1,275,480 indicates that the propionate salts require a low pH to be effective. It had not been thought that the propionate salts would be useful against bacteria at low levels in higher pH processed meats at temperatures above freezing probably because propionates, considered to be mycostats, are not effective against mold at high (greater than 5.3) pH. British Patent No. 1,562,568 describes the use of sodium propionate in frozen meats as a mycostat at pH 5.5 to 7.0 without any specific amounts being disclosed. Freezing greatly reduces the risk of microbial growth and also reduces the taste of the meat. Woolford and Anderson, Food Industries 17:622 (1945) describes the use of propionates in various foods for inhibiting various bacteria and molds, but not in meats at temperatures above freezing.

U.S. Pat. No. 4,883,673 to Gonzalez describes the use of bacteriocins in foods. The bacteriocins are not described as useful with propionates.

The shelf life of packaged (canned or fresh packaged) processed meat products is limited by bacterial spoilage. This spoilage is caused primarily by gram-negative bacteria and secondarily by lactic acid producing bacteria. One solution to this problem is to freeze the product during distribution to inhibit spoilage. This practice detracts from the fresh concept of the product and taste, increases the product cost and is a problem if there is a failure in the freezing. It would be preferred to refrigerate the meat preferably at between about 4° C. to 12° C. A method is needed for slowing the growth of pathogens at these temperatures in meat.

OBJECTS

It is therefore an object of the present invention to provide a method for inhibiting the growth of bacteria in a processed meat to extend shelf life. Further, it is an object of the present invention to provide a method which is simple and economical and which does not impart an off taste to the meat. Further still, it is an object of the present invention to provide preferred compositions incorporating a bacteriocin and a propionate adapted for use in the processed meat. These and other objects will become increasingly apparent by reference to the following description.

GENERAL DESCRIPTION

The present invention relates to a method for protecting an unspoiled processed meat having a pH between about pH 6.0 and 6.5 which comprises: inoculating the meat with a source of an inorganic propionate salt in an amount less than about 1% by weight which inhibits bacteria present in the meat without contributing a flavor to the meat; and storing the meat at temperatures above freezing, wherein growth of the bacteria in the meat is inhibited by the propionate salt.

The present invention further relates to a preferred composition which comprises an inorganic propionate salt and a bacteriocin from *Pediococcus acidilactici*, wherein the composition inhibits Pediococcus, Lactobacilli, Streptococcus, Listeria, Pseudomonas, Salmonella, Enterobacter, and Serratia in meats.

As used herein the term "meat" means animal flesh alone or in combination with various fillers. Such meats include, for instance, beef, poultry and fish. The term "processed" means handling of the flesh after the animal is killed, including slaughter, cutting, mixing, cooking and packaging. All of these steps introduce bacteria.

Preferably the inorganic propionate salt is an alkali metal or alkaline earth metal salt. The propionate salt can be in a pure form or provided as a component of a dried fermentation broth as described by Anderson (U.S. Pat. No. 4,497,833) and Ahern et al (U.S. Pat. Nos. 4,743,453 and 4,676,987). The *Propionibacterium shermanii* is used for this purpose. Other transition metal propionate salts can be used but are not preferred so long as they do not impart a taste to the meat.

The propionate salt is used in an amount of less than about 1% by weight in the meat, preferably between about 0.05 and 0.5% by weight. The composition can also contain chloride salts (e.g. sodium chloride) or nitrite or nitrate salts (e.g. sodium nitrite) or other such salts which inhibit the growth of bacteria. The chloride salt is used in amounts up to 4% by weight of the raw meat. The nitrite salt is limited to 2% by weight of the meat by law in the United States. The composition can also contain various fillers or dispersing liquids.

The bacteria inhibited in the processed meat by the propionate salt include psychrotrophs such as Pseudomonas sp, Salmonella sp such as *Salmonella newport;* and Listeria sp such as *Listeria monocytogenes,* Enterobacter sp, such as *Enterobacter agglomerans,* Serratia sp such as *Serratia liquefaciens* and other bacteria which occur in processed meat, because of the processing steps including slaughtering.

The Pediococcal bacteriocin is preferably derived from *Pediococcus acidilactici* NRRL-B-18050 as described in U.S. Pat. No. 4,883,673 to Gonzalez. The bacteriocin is provided at levels between about 1,500 and 5,000 AU of bacteriocin per gram of the composition which is introduced into the meat in a composition with the propionate salt. The result of introducing the composition into the meat is that the meat contains between about 15 and 45 AU of the bacteriocin per gram of meat. Pediococci, Lactobacilli and Streptococcus as well as Listeria are inhibited by the bacteriocin.

Preferably the propionate salt alone or with the bacteriocin are provided as a dried composition. The dried composition preferably contains between about 10 and 100% propionate salt by weight when used alone. When used with the bacteriocin the dried composition contains between about 10 and 99% propionate depending upon the weight of the bacteriocin. The propionate salts and optionally the bacteriocin can also be introduced into the meat as a liquid.

The propionate salts are effective in inhibiting the growth of spoilage organisms when incorporated into a marinade or sauce which dresses a packaged meat product. Additionally, incorporation of propionate salts in the basting solution used to pump meat products by injection provides an appropriate method for delivery of effective concentrations of the propionate salt to fresh meat and poultry products before cooking. The propionate salt can also be mixed with ground or comminuted processed meats.

The meats are usually packaged using flexible films for refrigerated meats or in cans, jars and the like. These packages can allow growth of the bacteria if not perfectly sealed.

SPECIFIC DESCRIPTION

The following are illustrative Examples of the method of the present invention.

EXAMPLE 1

A fresh, ground, pork sausage formulation was prepared which contained:
3000.0 g pork (30% fat)
60.0 g water
75.0 g salt
16.8 g spice mix (Paprika, white pepper, caraway seeds, cayenne pepper and ground anise seeds)
0 09 g ea. BHA/BHT
0.09 g sodium citrate The meat mixture was divided into 4 equal portions. One portion was retained as a control. Sodium propionate was added at 0.08%, 0.15% and 0.30% and the samples were incubated at 5° C. Total aerobic plate count and Gram-negative plate counts were conducted during 12 days incubation at 5° C. As seen in Table 1, as little as 0.08% sodium propionate effectively controlled the growth of Gram-negative spoilage bacteria. The total aerobic bacterial population was reduced 10 fold by the added sodium propionate.

TABLE 1

Effect of sodium propionate on the growth of spoilage bacteria in fresh sausage stored at 5° C.

| | Total Aerobic[1] Count (Log CFU/gram) | | | | Gram-Negative[2] Count (Log CFU/gram) | | | |
|---|---|---|---|---|---|---|---|---|
| | (Days of Storage at 5° C.) | | | | | | | |
| | 0 | 5 | 8 | 12 | 0 | 5 | 8 | 12 |
| Control | 3.98 | 5.65 | 7.36 | 8.10 | 4.89 | 5.72 | 6.11 | 7.66 |
| 0.08% Na Propionate | — | 4.88 | 5.83 | 7.62 | — | 3.41 | 4.52 | 4.25 |
| 0.15% Na Propionate | — | 4.48 | 5.83 | 7.81 | — | 4.15 | 3.79 | 3.76 |
| 0.30% Na Propionate | — | 3.84 | 3.79 | 5.61 | — | 3.90 | 3.52 | 3.76 |

[1]Total aerobic counts were conducted on tryptic soy agar (Difco), at 32° C.
[2]Gram-negative counts were conducted on CVT agar as described by Gilliland et al (Psychrotrophic microorganisms in Compendium of Methods for the Microbiological Examination of Foods. American Public Health Association, Marvin L. Speck, ed. 173–178 (1976)).

EXAMPLE 2

A fresh sausage was prepared as in Example 1. The sausage was divided into 5 equal portions. One portion was retained as control. The remaining portions were treated with either sodium propionate (0.30% or 0.43%) or calcium propionate (0.29% or 0.42%). The five samples were incubated at 5° C. and evaluated for total aerobic count and Gram-negative count during 17 days storage.

The results presented in Table 2 demonstrate that calcium propionate is equally effective as sodium propionate in inhibiting the growth of spoilage organisms in the meat system and provides less sodium in the meat.

TABLE 2

Comparison of sodium propionate and calcium propionate for inhibition of spoilage bacteria in fresh sausage.

| | Total Aerobic Count[1] (Log CFU/gram) | | | | | Gram-Negative Count[2] (Log CFU/gram) | | | | |
|---|---|---|---|---|---|---|---|---|---|---|
| | (Days Storage at 5° C.) | | | | | | | | | |
| | 0 | 8 | 13 | 15 | 17 | 0 | 8 | 13 | 15 | 17 |
| Control | <4.00 | 6.12 | 8.00 | 7.76 | 8.32 | 3.36 | 5.02 | 6.26 | 6.95 | 7.18 |
| 0.30% Na Prop. | — | <4.00 | 5.16 | 5.08 | 6.36 | — | 2.78 | <2.00 | <2.00 | <2.00 |
| 0.43% Na Prop. | — | <4.00 | 5.42 | 6.02 | 7.06 | — | 2.78 | <2.00 | <2.00 | <2.00 |
| 0.29% Ca Prop. | — | <4.00 | 5.13 | 5.24 | 6.46 | — | 3.08 | <2.00 | <2.00 | <2.00 |
| 0.42% Ca Prop. | — | <4.00 | 4.72 | 5.75 | 6.07 | — | — | <2.00 | <2.00 | <2.00 |

[1]See Table 1.
[2]See Table 1.

EXAMPLE 3

Fresh sausage was prepared as in Example 1 and was treated with either sodium lactate at 0.38% or sodium propionate at 0.30% which resulted in equivalent concentrations of lactate and propionate. The samples were stored at 5° C. and evaluated for total aerobic count and Gram-negative count.

As seen in Table 3, 0.30% sodium propionate inhibited the total aerobic population for 13 days and prevented the increase in the Gram-negative population for 17 days. Conversely, sodium lactate treatment failed to affect the total aerobic count and reduced the Gram-negative count only modestly during the 17 day incubation period.

This demonstrates that the inhibitory activity of propionate salts can be observed at a much lower concentration than might be needed for sodium lactate as set forth in U.S. Pat. No. 4,798,729 to Anders et al.

TABLE 3

Comparison of sodium propionate and sodium lactate for inhibition of spoilage bacteria in fresh sausage.

| | Total Aerobic Count[1] (Log CFU/g) | | | | Gram-Negative Count[2] (Log CFU/g) | | | | |
|---|---|---|---|---|---|---|---|---|---|
| | (days Storage at 5° C.) | | | | | | | | |
| | 0 | 9 | 13 | 17 | 0 | 6 | 9 | 13 | 17 |
| Control | 3.72 | 8.03 | 7.83 | 8.25 | 3.26 | 4.68 | 5.34 | 5.11 | 5.38 |
| 0.3% Na Propionate | — | 6.48 | 6.68 | 8.38 | — | 3.00 | 3.15 | 2.90 | 2.48 |
| 0.3% Na Lactate | — | 7.95 | 7.85 | 8.03 | — | 4.10 | 4.98 | 4.64 | 6.71 |

[1]See Table 1.
[2]See Table 1.

EXAMPLE 4

Inhibition of *Salmonella newport* in cooked chicken by sodium propionate.

Commercially sterile, canned, cooked chicken was obtained from a local market. The product contained white and dark chunked chicken, salt and water. The salt concentration was determined to be approximately 0.75%. The chicken was inoculated with *Salmonella newport* to deliver approximately 5000 CFU/gram. The inoculated chicken was divided into 4 portions. Sodium propionate was added to three portions at 0.22%, 0.30% or 0.42%. The fourth portion had no additions and served as the control.

As seen in Table 4, the sodium propionate effectively inhibited the growth of *Salmonella newport* in the inoculated chicken.

TABLE 4

Inhibition of *Salmonella newport* by sodium propionate in cooked chicken.

| | Log CFU/g[1] Days storage at 5° C. | | | | | | |
|---|---|---|---|---|---|---|---|
| | 0 | 6 | 9 | 14 | 19 | 23 | 28 |
| Control | 3.72 | 4.64 | 5.26 | 7.15 | 8.83 | 9.36 | 9.53 |
| 0.22% Na Prop. | — | 3.08 | 3.00 | 3.18 | 4.13 | 4.46 | 5.29 |
| 0.30% Na Prop. | — | 3.15 | 2.60 | 2.30 | <2.00 | 2.00 | <2.00 |
| 0.42% Na Prop. | — | 3.00 | 2.85 | 2.00 | <2.00 | 2.00 | 2.30 |

[1]Salmonella plate counts on tryptic soy agar (Difco) incubated at 32° C. Colonies confirmed as Salmonella.

EXAMPLE 5

Inhibition of *Salmonella newport* by calcium propionate in chicken.

Canned chicken was inoculated with *Salmonella newport* as in Example 4. The inoculated chicken was divided into two portions. Calcium propionate (0.42%) was added to one portion and the second was used as an uninoculated control. The samples were incubated at 5° C.

As noted in Table 5, growth of *Salmonella newport* was completely inhibited for the entire 27 day incubation. Thus, the calcium propionate inhibits the growth of *S. newport* as effectively as does the sodium salt (Example 4).

TABLE 5

Inhibition of *Salmonella newport* by calcium propionate in processed chicken.

| Days at 5° C. | Control | Calcium Propionate (0.42%) (Log CFU/g)[1] |
|---|---|---|
| 0 | 4.11 | |
| 5 | 6.37 | 3.71 |
| 8 | 7.73 | 3.45 |
| 12 | 9.47 | 3.15 |
| 16 | 9.34 | 3.00 |
| 20 | 9.56 | 2.78 |
| 27 | 9.56 | 2.85 |

[1]*S. newport* counts determined as described in Table 4.

EXAMPLE 6

Inhibition of *Listeria monocytogenes* by calcium propionate in cooked chicken.

Commercially sterile canned chicken was obtained from a local market, as in Example 4. The product contained white and dark chunked chicken, salt and water. The salt concentration was determined to be approximately 0.75%. The chicken was inoculated with a stock culture of *Listeria monocytogenes* to deliver approximately 4000 CFU/g The chicken was divided into two portions. Calcium propionate was added to one portion at a rate of 0.42%. The second portion functioned as the control.

As seen in Table 6, 0.42% calcium propionate effectively reduced the growth rate of *Listeria monocytogenes* in the processed chicken.

TABLE 6

Inhibition of *Listeria monocytogenes* by calcium propionate in canned chicken.

| Days at 5° C. | Control | Calcium propionate (0.42%) (Log CFU/g)[1] |
|---|---|---|
| 0 | 3.59 | |
| 5 | 7.63 | 4.57 |
| 8 | 8.87 | 4.93 |
| 12 | 9.33 | 5.80 |
| 16 | 9.23 | 6.52 |

[1]Listeria plate count on tryptic soy agar (Difco) incubated at 32° C. Colonies confirmed as Listeria.

EXAMPLE 7

A fresh sausage prepared as in Example 1 was divided into two portions. One portion was retained as the control. The second portion was treated with 1.32% by weight of a dried fermentation broth that contained 38% calcium propionate (0.50 percent by weight of the sausage). The broth was prepared as per Ahern et al (U.S. Pat. No. 4,743,453). The samples were incubated at 5° C. Total aerobic counts were conducted on APT agar during 18 days incubation at 5° C. The dried fermentation broth effectively reduced the level of bacterial growth in the sample.

TABLE 7

Effect of a calcium propionate containing fermentation broth on the growth of spoilage bacteria in fresh sausage at 5° C.

| | Total Aerobic Count (Log cfu/gram) (Day of Storage at 5° C.) | | | |
|---|---|---|---|---|
| | 0 | 5 | 11 | 18 |
| Control | 5.69 | 7.13 | 8.41 | 8.72 |

TABLE 7-continued

Effect of a calcium propionate containing fermentation broth on the growth of spoilage bacteria in fresh sausage at 5° C.

| | Total Aerobic Count (Log cfu/gram) (Day of Storage at 5° C.) | | | |
|---|---|---|---|---|
| | 0 | 5 | 11 | 18 |
| Test | | 5.26 | 5.65 | 6.88 |

EXAMPLE 8

A propionate containing powder was prepared. One broth was prepared and dried by the method of Ahern et al (U.S. Pat. No. 4,743,453). The second broth was prepared by fermenting a dextrose yeast extract medium by a strain of *Pediococcus acidilactici* (NRRL-B-18050) by the method described by Gonzalez (U.S. Pat. No. 4,883,673) to produce a bacteriocin. The dried propionate as a powder was added to the bacteriocin containing broth and then dried. Eighty-five percent (85%) by weight of the dried product is the propionate salt containing material and fifteen percent (15%) by weight is the dried bacteriocin containing material. The bacteriocin was present in an amount of about 1600 AU per ml in the broth. The propionate salt was present in an amount of about 32% by weight calcium propionate in the powder. The AU of the powder was about 3000 AU per gram. The bacteriocin provided inhibition of spoilage against various Pediococci, Lactobacilli and Streptococcus, as well as Listeria.

This fermented powder was incorporated into a lemon herb dressing (27% solids) at a rate of 1%. The dressing has a near neutral pH. Chicken breast quarters were dredged through the marinade and vacuum packaged. A control chicken breast was coated with an identical marinade that did not contain the propionate containing solids and similarly vacuum packaged.

The samples were incubated at 5° C. for 21 days at which time the samples were evaluated for the increase in the concentration of gram-negative bacteria. The control sample contained $4 \times 10^4$ gram-negative bacteria per gram. Conversely, in the treated sample the gram-negative count was less than 100.

EXAMPLE 9

The calcium propionate and bacteriocin powder described in Example 8 was evaluated in a canned meat spread which contains nitrite which has a near neutral pH. The commercially available meat spread (SPAM ®, Hormel) was inoculated with the hereinafter specified test bacteria at a rate of 5,000 viable cells per gram. The inoculated product was divided into two portions. The calcium propionate and bacteriocin powder was added to one portion at a rate of 1% (contains 0.32% calcium propionate). The second portion of meat served as the control. The samples were incubated at 7° C. for 19 days at which time the bacterial population was enumerated.

As seen in Table 8, the propionate powder effectively eliminated *Listeria monocytogenes* and *Salmonella newport. Staphylococcus aureus* was significantly reduced.

TABLE 8

Inhibition of Listeria, Salmonella and Staphylococcus by calcium propionate and bacteriocin powder ALTA ™ 1801 in a model meat system[1].

| Test Organism | Rate | Microbial Quality |
|---|---|---|
| Listeria | @ 1.0% | Control $>10^9$ @ 19 days |
| | | Powder $<100$ @ 19 days |
| Salmonella | @ 1.0% | Control $= 10^7$ @ 19 days |
| | | Powder $<500$ @ 19 days |
| Staphylococcus | @ 1.0% | Control $= 5 \times 10^7$ @ 19 days |
| | | Powder $= 7 \times 10^4$ @ 19 days |

[1]SPAM ® spread was inoculated with *Listeria monocytogenes, Salmonella newport* or *Staphylococcus aureus* at a rate of 5,000 viable cells per gram meat. Each inoculated product was divided into two portions. The powder was added to one portion at a rate of 1% by weight (0.32% calcium propionate).

As can be seen from the foregoing description, the propionate salts at near neutral pH's and at refrigeration temperatures inhibited the growth of spoilage bacteria. Taste tests confirmed that the meats with the propionate salts at the low levels (0.05 to 1.0% and preferably 0.5% or less by weight of the meat or meat formulation) did not impart any taste. The bacteriocin is tasteless at the levels used.

It is intended that the foregoing description be only illustrative of the present invention and that the present invention be limited only by the hereinafter appended claims.

We claim:

1. A method for protecting an unspoiled processed and cooked meat having a pH between about pH 6.0 and 6.5 which comprises:
   (a) inoculating the meat or a solution for addition to the meat with a dried product which consists of as ingredients for the protecting, a source of an inorganic propionate salt in an amount less than about 1% by weight which inhibits bacteria present in the meat without contributing a flavor to the meat and a bacteriocin derived from *Pediococcus acidilactici* as a result of growth in a broth which produces the bacteriocins in the broth in an amount which inhibits Pediococci, Lactobacilli, Streptococci, Pseudomonas, Salmonella Listeria, Serratia, and Enterobacter wherein the dried product contains between about 10 and 99% by weight propionate salt.

2. The method of claim 1 wherein the salt is selected from the group consisting of calcium propionate and sodium propionate.

3. The method of claim 1 wherein the propionate salt is used in an amount between about 0.05% to 0.5% by weight of the meat.

4. The method of claim 1 wherein the bacteria are psychrotrophic bacteria.

5. The method of claim 1 wherein the bacteria include psychrotrophic bacteria.

6. The method of claim 1 wherein the bacteria include *Salmonella newport*.

7. The method of claim 1 wherein the bacteria include *Listeria monocytogenes*.

8. The method of claim 1 wherein the meat contains sodium chloride.

9. The method of claim 8 wherein the sodium chloride is present in an amount up to about 4% by weight.

10. The method of claim 1 wherein the meat is canned meat.

11. The method of claim 1 wherein the meat contains a nitrite salt.

12. The method of claim 1 wherein the propionate salt and the bacteriocin are provided together as a dried product derived from combining dried fermentation broth from *Propionibacterium shermanii* and broth from the *Pediococcus acidilactici* and drying the broth to provide the dried product.

* * * * *